(12) United States Patent
Iwase

(10) Patent No.: US 7,314,280 B2
(45) Date of Patent: Jan. 1, 2008

(54) PROJECTOR APPARATUS

(75) Inventor: Nobutake Iwase, Tokyo (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 11/221,941

(22) Filed: Sep. 9, 2005

(65) Prior Publication Data

US 2006/0061736 A1    Mar. 23, 2006

(30) Foreign Application Priority Data

Sep. 21, 2004  (JP) .......................... P2004-273815

(51) Int. Cl.
*G03B 21/16* (2006.01)
*G03B 21/18* (2006.01)
*H04N 5/74* (2006.01)
*G02F 1/1333* (2006.01)
*H05K 7/20* (2006.01)

(52) U.S. Cl. ........................ 353/61; 353/57; 353/60; 348/748; 349/161; 361/695

(58) Field of Classification Search ................ 353/61, 353/52, 57, 58, 60; 349/161; 348/748; 361/695
See application file for complete search history.

(56) References Cited

U.S. PATENT DOCUMENTS 6,471,357 B1 * 10/2002 Hara et al. ............... 353/57
2004/0125343 A1 * 7/2004 Hara et al. ............... 353/57

FOREIGN PATENT DOCUMENTS

JP      2001-013589       1/2001

* cited by examiner

*Primary Examiner*—Rochelle Blackman
(74) *Attorney, Agent, or Firm*—Finnegan, Henderson, Farabow, Garrett & Dunner, L.L.P.

(57) ABSTRACT

A projector apparatus includes: an optical system unit including an optical prism unit having liquid crystal panels for modulating red light, green light, and blue light and a dichroic prism, and a PS conversion device for aligning the polarization directions of the light from a light source lamp; cooling means for cooling the optical system unit; and an outer cabinet for mounting the optical system unit and the cooling means. The cooling means includes: a sirocco fan having a suction port; a first air trunk for guiding the airflow from the sirocco fan through a first duct to the optical prism unit so as to cool the optical prism unit; and a second air trunk for guiding the airflow from the sirocco fan and the first duct through a second duct to the PS conversion device so as to cool the PS conversion device, the second air trunk being partitioned from the first air trunk by a partition wall; and a warm airflow having been warmed by being served to cooling from the first air trunk and the second air trunk is guided into the inside of the outer cabinet to be cooled to normal temperature, before being recirculated through the suction port to the sirocco fan.

2 Claims, 10 Drawing Sheets

PROJECTOR APPARATUS

CROSS REFERENCES TO RELATED APPLICATION

The present invention contains subject matter related to Japanese Patent Application JP 2004-273815 filed in the Japanese Patent Office on Sep. 21, 2004, the entire contents of which being incorporated herein by reference.

BACKGROUND OF THE INVENTION

The present invention relates to a projector apparatus preferable for use in, for example, a rear projection television using transmission type liquid crystal panels, and particularly to realization of a projector apparatus so configured that a warm airflow upon cooling a PS conversion device (hereinafter referred to as PS converter) for aligning the polarization directions of the light from a light source lamp is exhausted and the cooling effect on the PS converter and an optical prism unit can be enhanced.

A rear projection television is so designed that the light from a light source lamp is made to be incident on an optical prism unit including red, green, and blue liquid crystal panels and a dichroic prism, whereby images can be projected on a screen. To be more specific, the light from the light source lamp is aligned in light polarization direction by a PS converter, before being incident on the optical prism unit including the liquid crystal panels and the dichroic prism.

The liquid crystal panels in the optical prism unit and the PS converter are heated to a high temperature by the light from the light source lamp. Particularly, the PS converter is a device directly receiving the light from the light source lamp and is therefore heated to a very high temperature, for example, around 75° C. In view of this, the liquid crystal panels and the PS converter are cooled by blowing air thereto from a cooling mechanism such as a sirocco fan.

Here, in relation to the above-mentioned projector apparatus, there has been disclosed a technology in which the optical prism unit having liquid crystal panels is cooled by a blower (see, for example, Japanese Patent Laid-open No. 2001-13589).

In the technology disclosed in the patent reference, the projector apparatus includes an optical system unit 2, a cooling fan 3 for cooling a light valve portion of the optical system unit 2 and the surroundings thereof, and an outer cabinet 4 to which the optical system unit 2 and the cooling fan 3 are mounted. A sirocco fan is used as the cooling fan 3, the airflow from the sirocco fan is guided through a duct 5 to the light valve and the surroundings thereof, and is distributed by airflow amount control means provided in the duct, to thereby effectively cool the light valve and the surroundings thereof.

SUMMARY OF THE INVENTION

The above-mentioned patent reference includes no description about the cooling of the PS converter. In the projector apparatus in the past, there is no place to which the warm airflow having been served to cooling of the PS converter can be exhausted. Therefore, the warm air flows into the space surrounded by the wall surfaces of the optical prism unit having the liquid crystal panels, to stagnate in the space. As a result of the stagnation of the warm air, which is not discharged after cooling the PS converter, the cooling effects on the liquid crystal panels and input/output deflecting plates and on the PS converter itself are lowered, whereby the useful lives of the devices are shortened.

Thus, there is a need to provide a projector apparatus in which the stagnation of warm air after cooling of a PS converter is prevented, cooling effects on the PS converter and an optical prism unit are enhanced, and the lives of devices can thereby be elongated.

To fulfill the need, according to an embodiment of the present invention, there is provided a projector apparatus including: an optical system unit including an optical prism unit having liquid crystal panels for modulating red light, green light, and blue light and dichroic prisms, and a PS conversion device for aligning the polarization directions of the light from a light source lamp; cooling means for cooling the optical system unit; and an outer cabinet for mounting the optical system unit and the cooling means. The cooling means includes: a sirocco fan having a suction port; a first air trunk for guiding the airflow from the sirocco fan through a first duct to the optical prism unit so as to cool the optical prism unit; and a second air trunk for guiding the airflow from the sirocco fan and the first duct through a second duct to the PS conversion device so as to cool the PS conversion device, the second air trunk being partitioned from the first air trunk by a partition wall; and a warm airflow having been warmed by being served to cooling from the first air trunk and the second air trunk is guided into the inside of the outer cabinet to be cooled to normal temperature, before being recirculated through the suction port to the sirocco fan.

According to this projector apparatus, the warm air upon the cooling of the PS converter is discharged through the second air trunk into the inside of the outer cabinet, so that the cooling effect on the PS converter can be enhanced. In addition, the warm air upon the cooling of the PS converter can be prevented from flowing into the optical prism unit to stagnate there, so that the cooling effect on the optical prism unit can also be enhanced. As a result, the lives of the PS converter and the liquid crystal panels and of such devices as input/output deflecting plates can be elongated.

In the projector apparatus as above, a guide plate for guiding the warm airflow from the second air trunk into the inside of the outer cabinet may be provided at an outlet portion of the second air trunk. According to this projector apparatus, since the guide plate for guiding the warm airflow from the second air trunk into the inside of the outer cabinet is provided at the outlet portion of the second air trunk, the warm air upon the cooling of the PS converter is guided by the guide plate so as to be securely discharged into the inside of the outer cabinets, and does not stagnate in the optical prism unit.

BRIEF DESCRIPTION OF THE DRAWINGS

These and other objects of the invention will be seen by reference to the description, taken in connection with the accompanying drawings, in which.

DETAILED DESCRIPTION OF THE PREFERRED EMBODIMENTS

Figure 1:
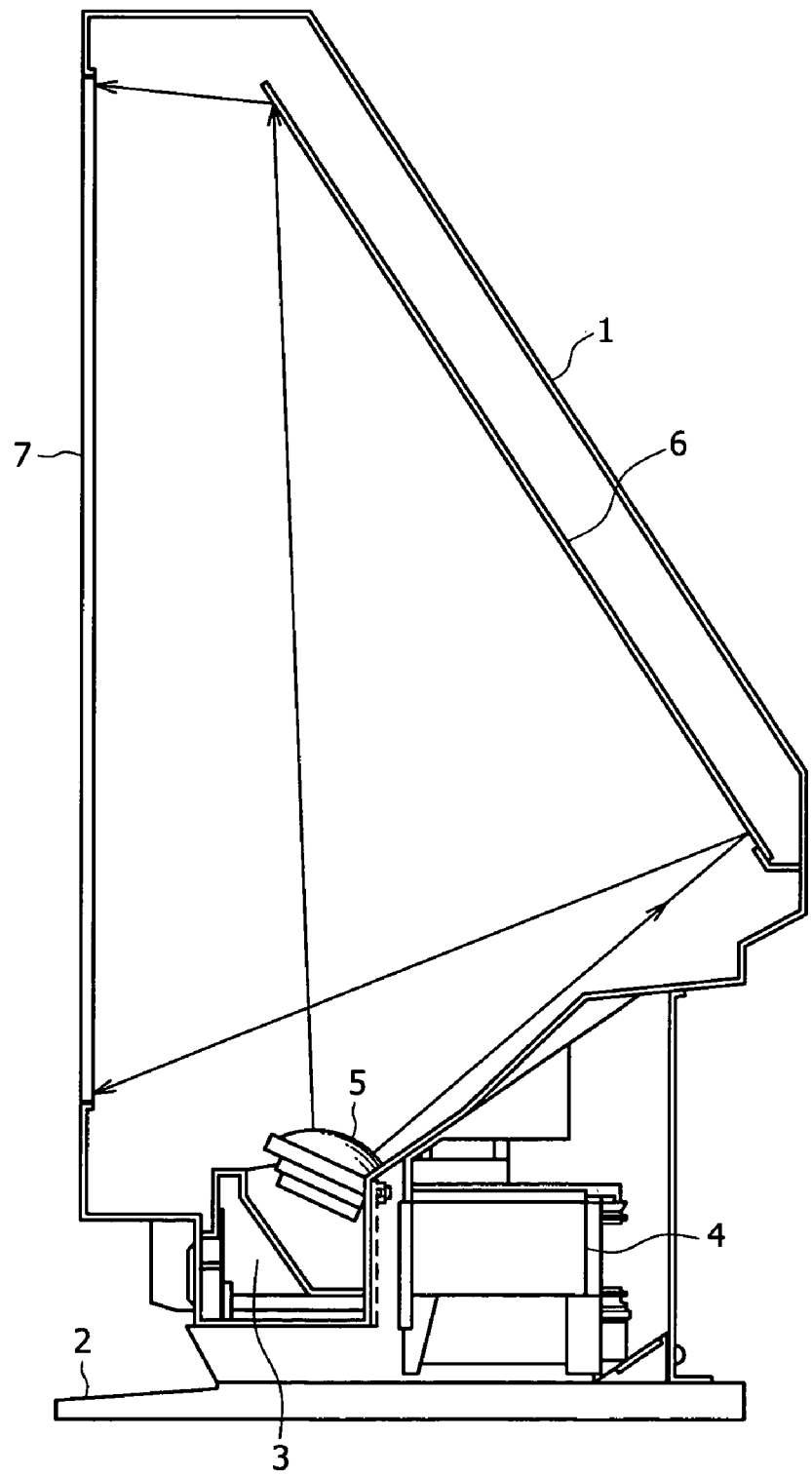
FIG. 1 is an overall internal constitutional view of a rear projection television to which the present invention is applied.

Now, a best mode for carrying out the projector apparatus according to an embodiment of the present invention will be described below, taking the case of application of the projector apparatus to a rear projection television as an example and referring to the drawings.

FIG. 1 is a side view showing the overall internal configuration of the rear projection television.

An outer cabinet 1 constituting an outer casing of the rear projection television has a bottom cabinet 2 at a lower end portion thereof. An optical unit 4 and a projection lens 5 are disposed at a lower portion of the inside of the outer cabinet 1. The optical unit 4 modulates a luminous flux outgoing from a light source lamp 3 and forms an optical image according to picture information. The projection lens 5 enlargingly projects the optical image coming from the optical unit 4. The optical image enlargedly projected from the projection lens 5 is reflected by a reflecting mirror 6 disposed slantly in the outer cabinet 1, and is projected on a screen 7 at the front surface of the outer cabinet 1.

Figure 2:
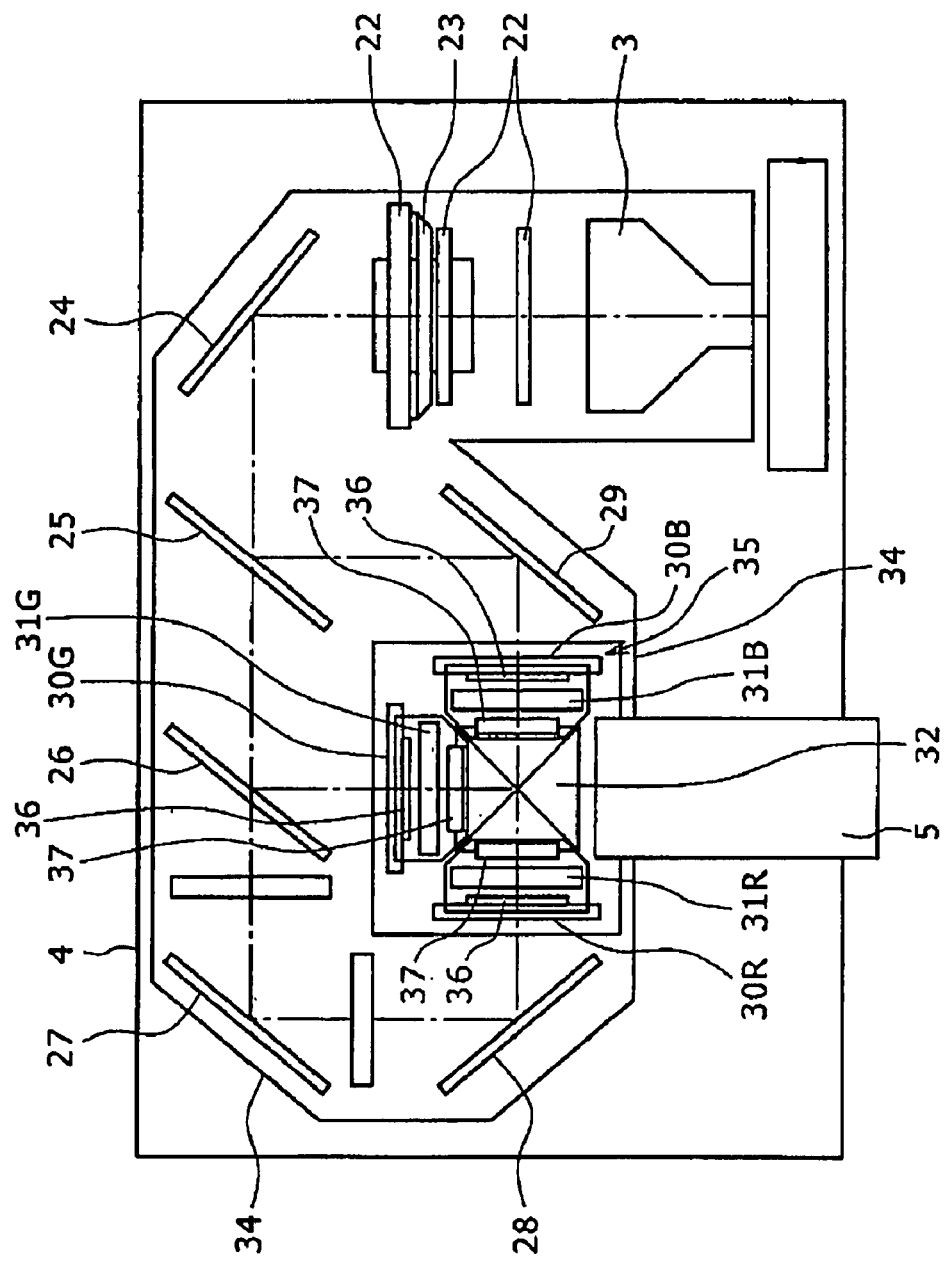
FIG. 2 is a detailed constitutional view of an optical unit.

FIG. 2 shows a detailed constitutional view of the optical unit 4.

The optical unit 4 includes the light source lamp 3, a fly-eye lens group 22, a PS converter 23, color separation mirrors (dichroic mirrors) 25 and 26, reflecting mirrors 24, 27, 28, and 29, three condenser lenses 30R, 30G, and 30B, three sets of light valves 35 composed of incidence-side polarizing plates 36, liquid crystal panels 31R, 31G and 31B, and outgoing-side polarizing plates 37, a color combining cross prism (dichroic prism) 32, the projection lens 5, and a unit frame 34.

The PS converter 23 is formed by a method in which strips of glass coated with a dielectric film are adhered to each other with an adhesive. On the incidence side of the liquid crystal panels 31R, 31G, and 31B, the incidence-side polarizing plates (polarizing films) 36 are adhered to the condenser lenses 30R, 30G, and 30B through thin glass sheets, respectively; on the outgoing side of the liquid crystal panels 31R, 31G, and 31B, the polarizing plates 37 are adhered to the cross prism 32 through thin glass sheets, respectively.

The light radiated from the light source lamp 3 is made uniform by the fly-eye lens group 22, is aligned in polarization direction by the PS converter 23, and is then separated into R (red), G (green), and B (blue) by the reflecting mirrors 24, 27, 28, and 29 and the color separation mirrors 25 and 26.

The color beams incident on the liquid crystal panels 31R, 31G, and 31B after passing through the condenser lenses 30R, 30G, and 30B and the polarizing plates 36 are modulated by a picture signal, and their transmittances are controlled through the polarizing plates 37. The color beams thus modulated by the picture signal while passing through the liquid crystal panels 31R, 31G, and 31B are color combined by the cross prism 32, and the color-combined beams are projected on the screen 7 by the projection lens 5.

Figure 3:
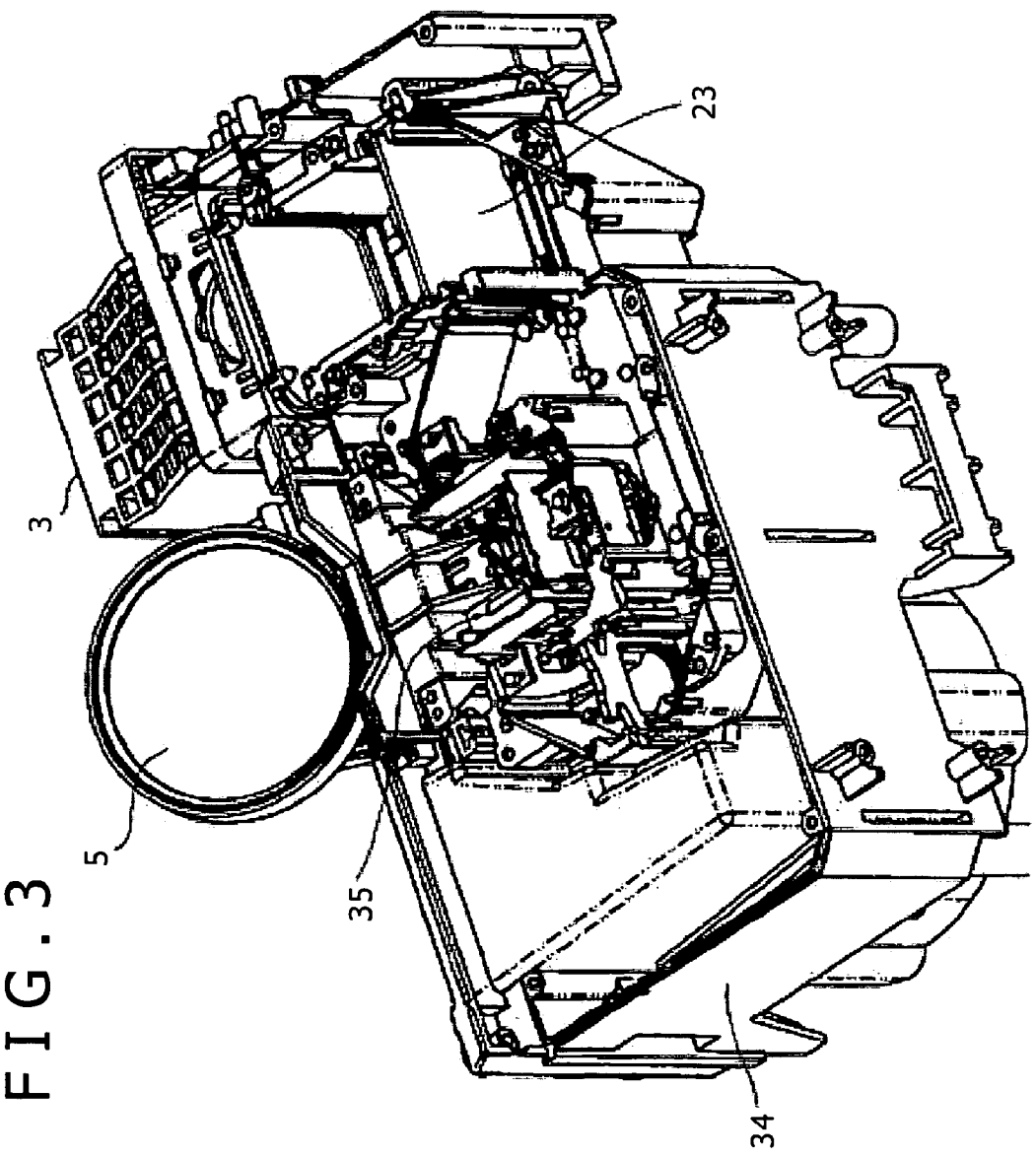
FIG. 3 is a perspective view showing the condition where a unit frame incorporating an optical unit is set in a lower unit box of an outer cabinet together with a light source lamp and a projection lens.
Figure 4:
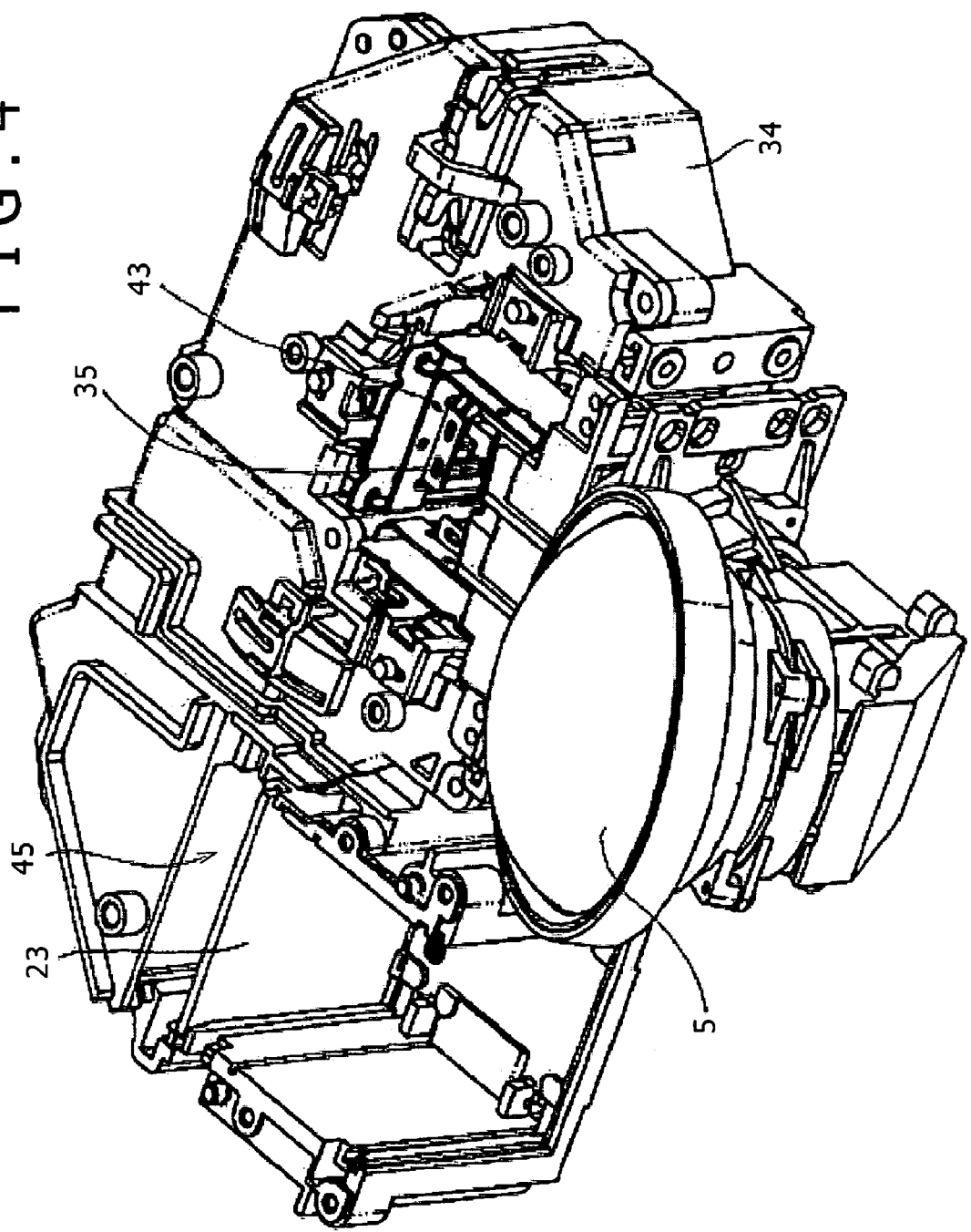
FIG. 4 is a perspective view of FIG. 3 as viewed from a different direction.
Figure 5:
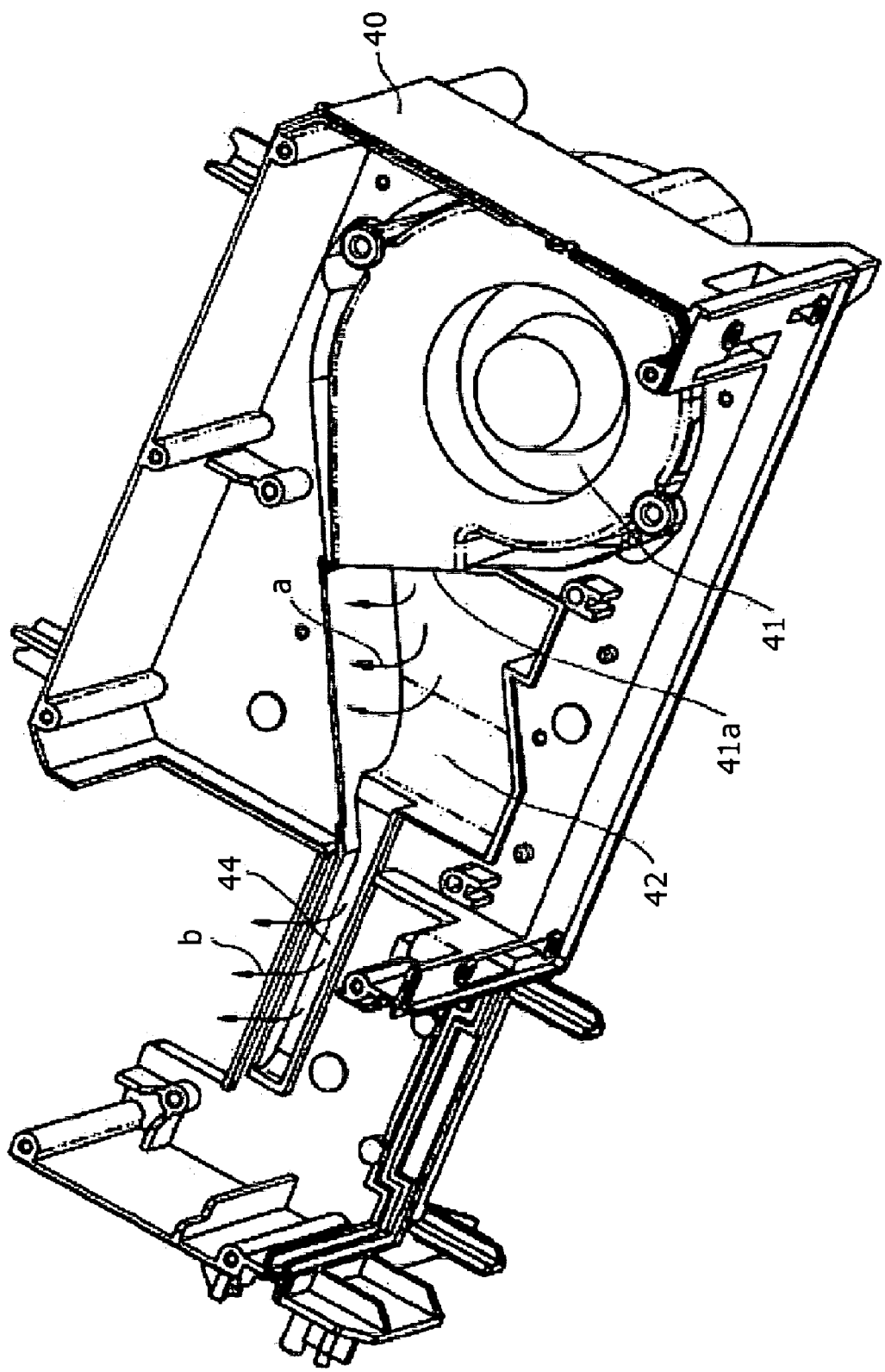
FIG. 5 is a perspective view of the lower unit box in the condition where the unit frame has been removed.
Figure 6:
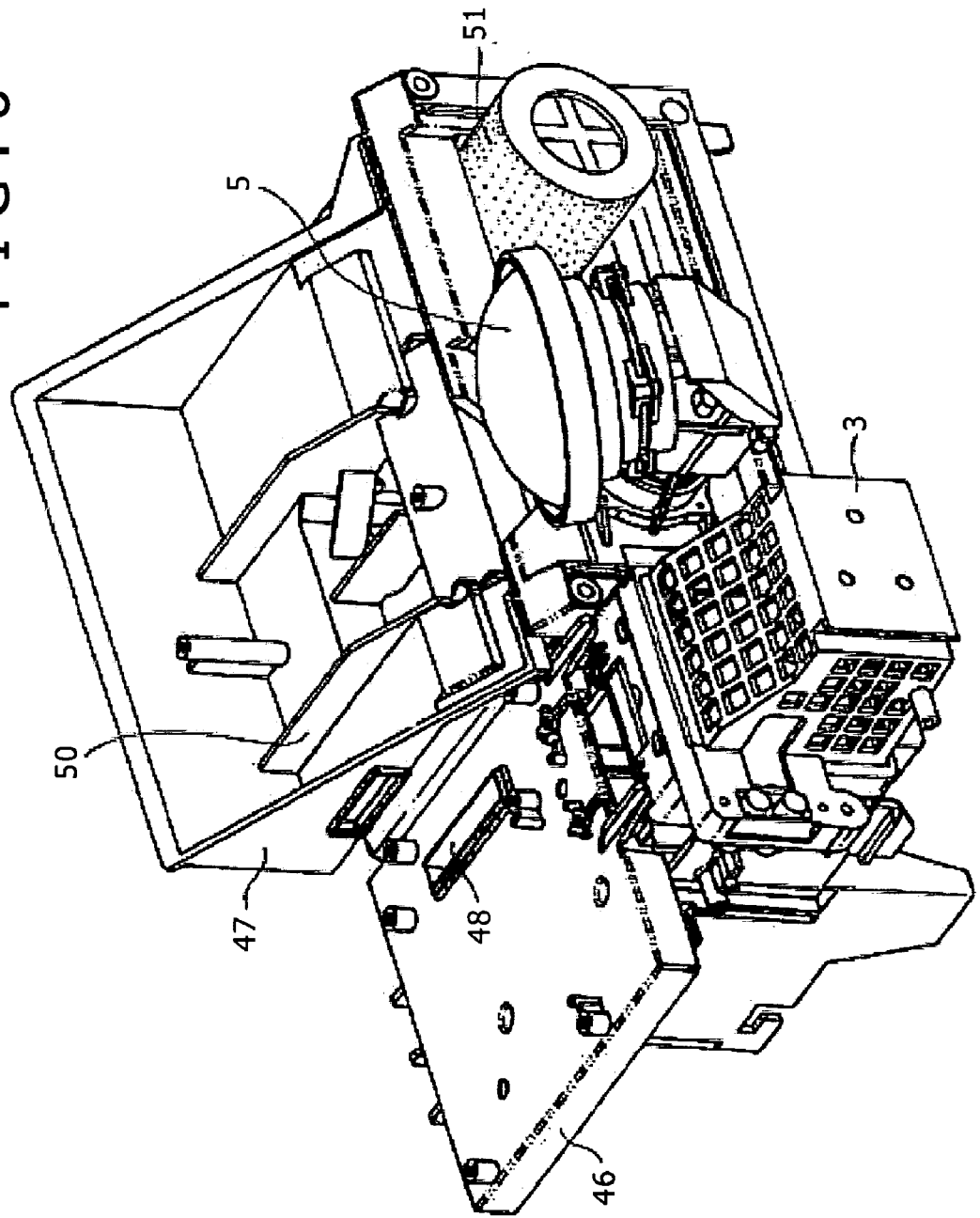
FIG. 6 is a perspective view showing an exhaust duct for a light valve and an exhaust passage for a PS converter.
Figure 7:
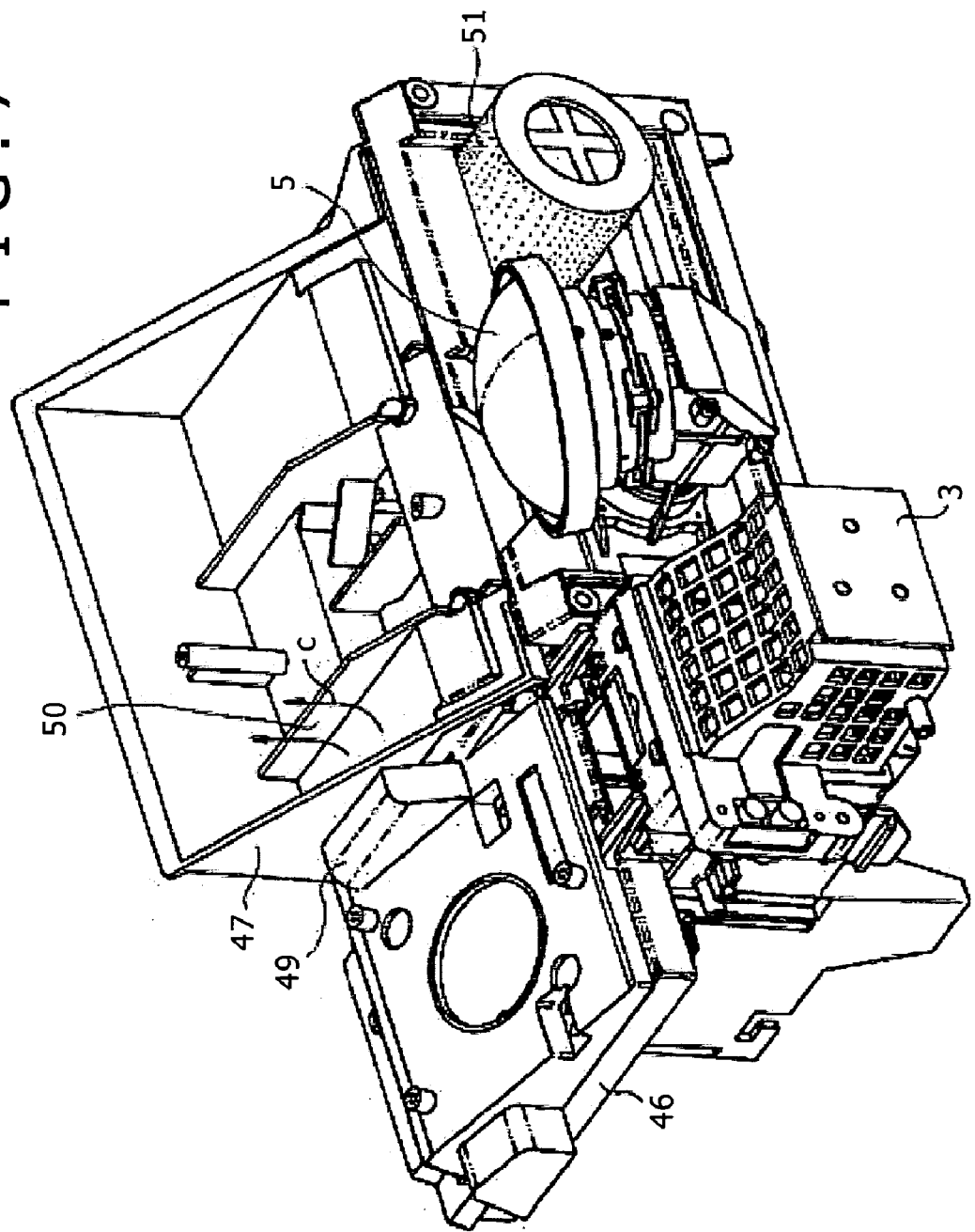
FIG. 7 is a perspective view showing the condition where an exhaust duct is connected to the exhaust passage for the PS converter.
Figure 8:
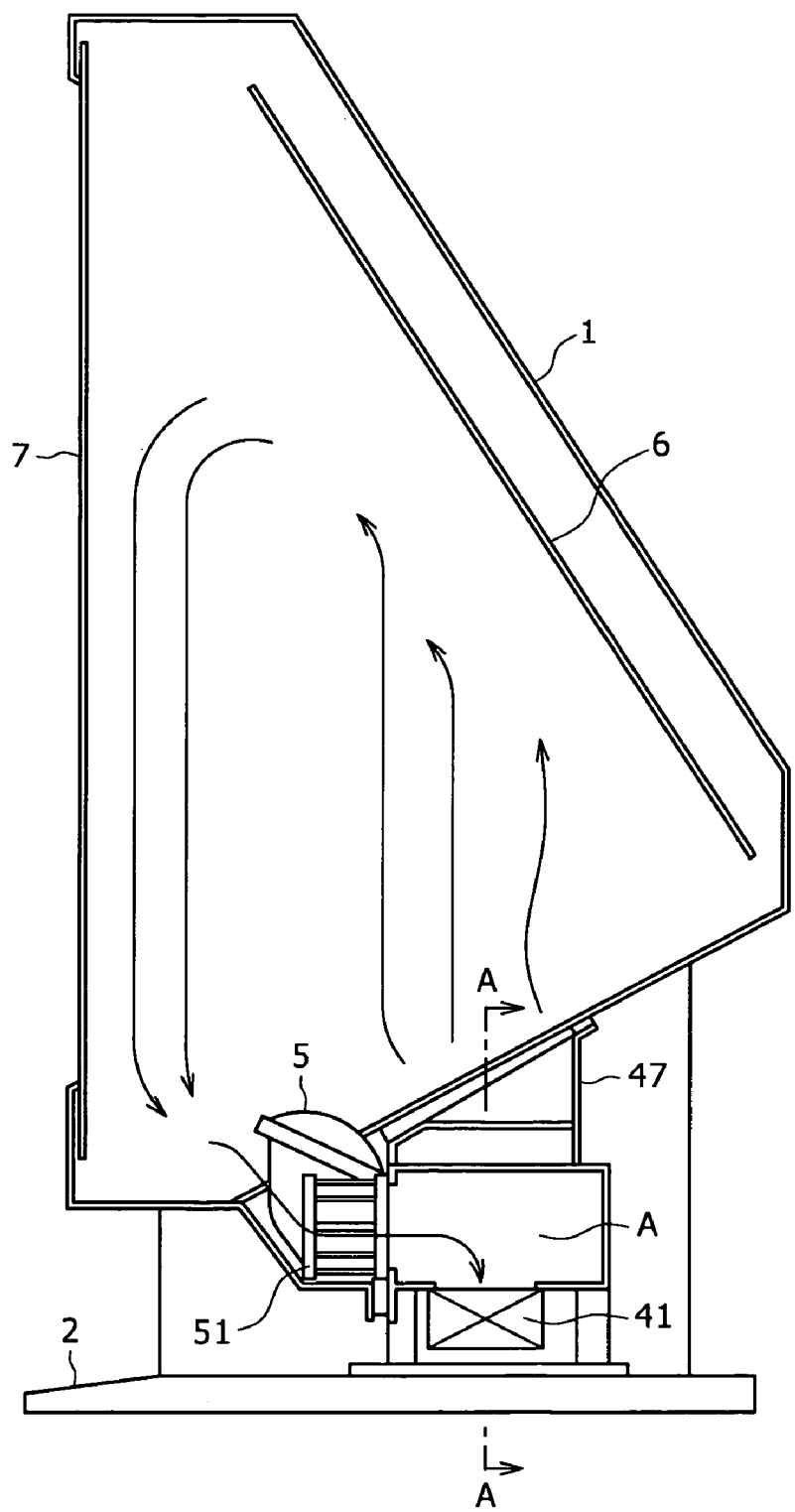
FIG. 8 is a side view of the inside of the rear projection television, showing the recirculation of the warm air having been served to cooling.
Figure 9:
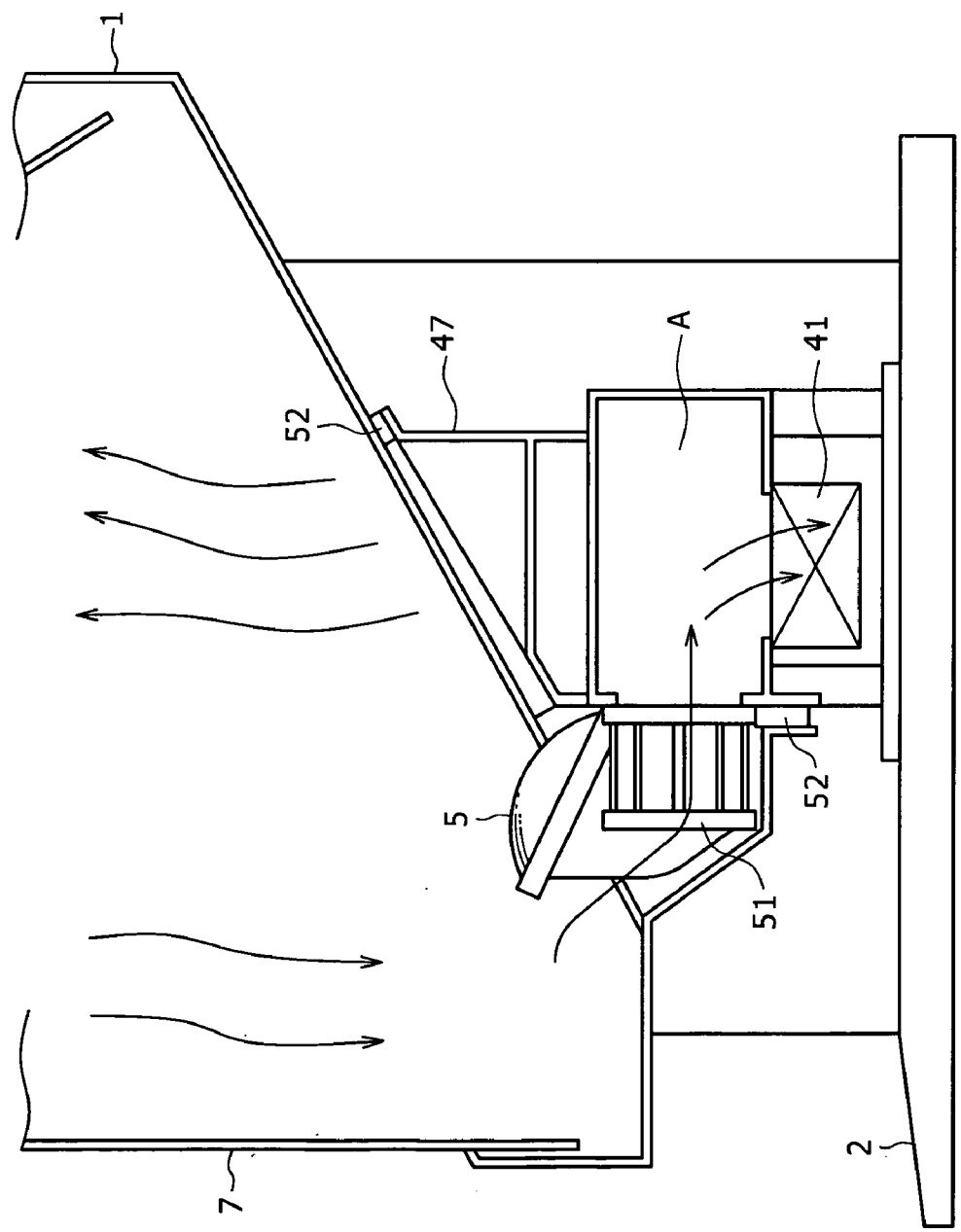
FIG. 9 is an enlarged side view of the same.
Figure 10:
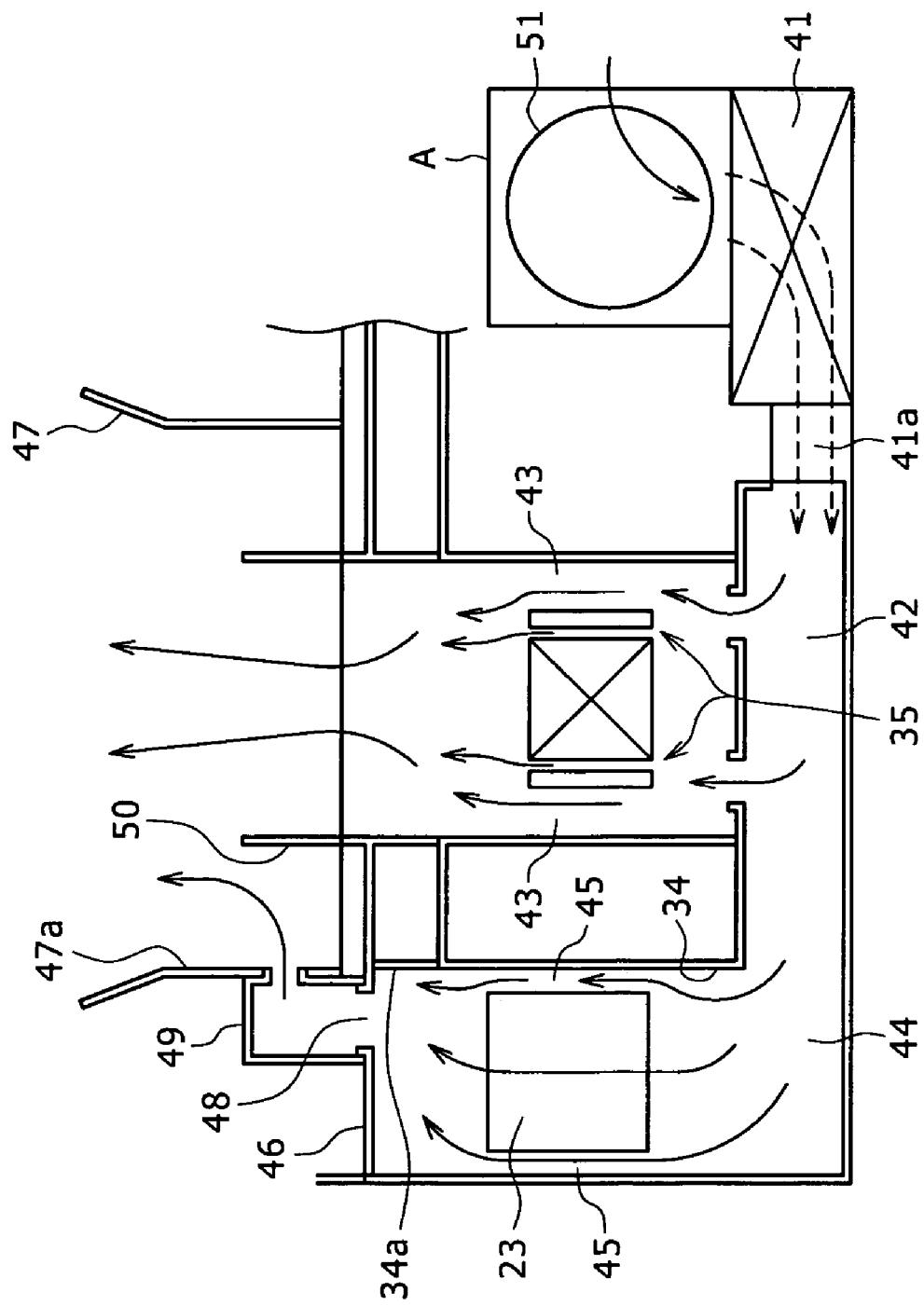
FIG. 10 is a sectional view along line A-A of FIG. 8, showing the cooling passages for the light valve and the PS converter and the exhaust passage for warm air.

Now, an air trunk mechanism for cooling the light valves 35 and the PS converter 23 in the optical unit 4 will be described below. FIGS. 3 and 4 are perspective views, from different directions, showing the condition where a unit frame 34 incorporating the above-mentioned optical unit 4 is set in a lower unit box 40 together with the light source lamp 3 and the projection lens 5; FIG. 5 is a perspective view of the lower unit box 40 in the condition where the unit frame 34 has been removed; FIG. 6 is a perspective view showing an exhaust duct for the light valves and an exhaust passage for the PS converter; FIG. 7 is a perspective view showing the condition where an exhaust duct is connected to the exhaust passage for the PS converter; FIG. 8 is a side view of the inside of the rear projection television, showing the recirculation of the warm air having been served to cooling; FIG. 9 is an enlarged side view of the same; and FIG. 10 is a sectional view along line A-A of FIG. 8, showing the cooling passages for the light valves and the PS converter and the exhaust passage for warm air.

A sirocco fan 41 as blowing section is disposed at a bottom portion in the lower unit box 40. A first blowing duct 42 into which air blown through a blowing port 41a is guided is provided on the blowing side of the sirocco fan 41, and the air blown up from the first blowing duct 42 passes through the gaps between the incidence-side polarizing plates 36 and the outgoing-side polarizing plates 37 and the liquid crystal panels 31R, 31G, and 31B, which defines air trunks 43 for the light valves 35, whereby the light valves 35 are cooled.

In addition, a second blowing duct 44 communicated with the first blowing duct 42 is provided at a bottom portion in the lower unit box 40, and the air blown up from the second blowing duct 44 passes through an air trunk 45 for the PS converter 23, whereby the PS converter 23 is cooled.

Here, an upper unit box 46 is mounted to the upper surface of the unit frame 34, the light valve 35 side of the upper unit box 46 is surrounded by a first duct 47, and is communicated with the air trunk 43. The first duct 47 opens into the inside of the outer cabinet 1 in which the screen 7 is disposed.

In addition, the air trunk 45 for the PS converter 23 is shielded from the air trunk 43 for the light valves 35 by a partition wall 34a of the unit frame 34.

The air trunk 45 for the PS converter 23 is communicated with an exhaust port 48 formed in he upper unit box 46, and is communicated, through the second duct 49 connected to the exhaust port 48, to the inside of the above-mentioned first duct 47 via one side wall 47a of the first duct 47. In addition, a guide plate 50 for guiding the air flowing through the second duct 49 into the first duct 47 to the side of the outer cabinet 1 is formed inside the first duct 47. Symbol 51 denotes a suction port provided with a filter for sucking air into the sirocco fan 41, and the air sucked in through the suction port 51 is sucked into a cavity portion A, from which it flows downstream to be sucked into the sirocco fan 41, and is blown via a blowing port 41a. The sirocco fan 41 configured in this form is disposed with its suction port 51 exposed to the inside of the outer cabinet 1. Incidentally, in FIG. 9, the outer cabinet 1 and the cavity portion A are hermetically sealed with a cushion seal member 52.

Now, the cooling action on the light valves 35 and the PS converter 23 and a discharge conduit for the warm air after cooling will be described below.

The air blown out of the blowing port 41a of the sirocco fan 41 passes through the first blowing duct 42, and the air blown up therefrom as indicated by arrows "a" flows into the air trunk 43 for the light valves 35. Here, the air cools the light valves 35 while passing through the gaps between the incidence-side polarizing plates 36 and the outgoing-side polarizing plates 37 and the liquid crystal panels 31R, 31G, and 31B. Then, the warm air warmed by being served to the cooling of the light valves 35 flows into the first duct 47, and is discharged therefrom into the inside of the outer cabinet 1.

On the other hand, a portion of the air blown out of the blowing port 41a of the sirocco fan 41 passes through the first blowing duct 42 and through the second blowing duct 44, and the air blown up therefrom as indicated by arrows "b" passes through the air trunk 45 for the PS converter 23, thereby cooling the PS converter 23. Then, the warm air warmed by being served to the cooling of the PS converter 23 flows through the exhaust port 48 of the upper unit box 46 and through the second duct 49 into the first duct 47. Here, the warm air flowing from the second duct 49 into the first duct 47 impinges on the guide plate 50 disposed in the first duct 47, upon which it flows upwards as indicated by arrows c, to be discharged into the inside of the outer cabinet 1.

Here, the warm air warmed through the cooling of the light valves 35 and the warm air warmed through the cooling of the PS converter 23 are made to stagnate in the inside of the outer cabinet 1, thereby being cooled nearly to normal temperature, and the thus cooled air is sucked again (recirculated) into the sirocco fan 41 through the suction port 51, for contributing again on the cooling of the light valves 35 and the PS converter 23.

Thus, according to an embodiment of the present invention, the warm air warmed through the cooling of the PS converter 23 is made to pass through the exclusive-use exhaust port 48, the second duct 49 and the first duct 47, to be discharged into the inside of the outer cabinet 1. Therefore, the problem that the warm air warmed by being served to the cooling of the PS converter 23 stagnates on the side of the light valves including the liquid crystal panels and the like, with the result of hampering the cooling action on the light valves, can be obviated, and the light valves 35 and the air trunk 43 therefor can be cooled effectively. By this, the lives of the incidence-side polarizing plates 36, the outgoing-side polarizing plates 37, and the liquid crystal panels 31R, 31G, and 31B constituting the light valves 35 can be prolonged.

In addition, since the warm air warmed through the cooling of the PS converter 23 is forcibly discharged through the exclusive-use exhaust port 48 and the second duct 49 into the inside of the outer cabinet 1, the warm air is prevented from stagnating around the PS converter 23, so that the PS converter 23 and the air trunk 45 therefor can be cooled effectively. In the case where the PS converter 23 cannot be cooled sufficiently, the temperature of the PS converter 23 has been as high as about 75° C., for example. On the other hand, where the air trunk mechanism according to an embodiment of the present invention is applied, the temperature is lowered to or below 60° C., and the life of the PS converter 23 can be thereby prolonged.

Besides, the warm air flowing from the second duct 49 into the first duct 47 after warmed through the cooling of the PS converter 23 impinges on the guide plate 50 disposed in the first duct 47, and flows upwards as indicated by arrows c, to be discharged into the inside of the outer cabinet 1. With this configuration, the warm air would not flow to the side of the light valves 35, and, therefore, would not spoil the cooling action on the light valves 35.

The present invention is not limited to the embodiment described above and shown in the drawings, and various modifications are possible within the scope of the gist of the invention.

While the case of application of the present invention to the rear projection television has been described in the above embodiment, the invention is widely applicable also to front projection television.

What is claimed is:

1. A projector apparatus comprising:
   an optical system unit including an optical prism unit and a PS conversion device for aligning polarization directions of light from a light source lamp;
   cooling means for cooling the optical system unit; and
   a cabinet containing therein the optical system unit and the cooling means; wherein
   the cooling means further comprises:
   a sirocco fan having a suction port;
   a first air trunk for guiding air from the sirocco fan through a first duct to the optical prism unit; and
   a second air trunk for guiding air from the sirocco fan through the first duct and a second duct to the PS conversion device, the second air trunk being shielded from the first air trunk by a partition wall; and wherein
   the cabinet receives the air from the first air trunk and the second air trunk so as to cool the air to normal temperature before recirculating into the suction port of the sirocco fan.

2. The projector apparatus as set forth in claim 1, wherein the cooling means further comprises a guide plate for guiding the air from the second air trunk into the cabinet.

* * * * *